US011957172B2

(12) United States Patent
Mironov et al.

(10) Patent No.: US 11,957,172 B2
(45) Date of Patent: Apr. 16, 2024

(54) HEATER ASSEMBLY HAVING HEATER ELEMENT ISOLATED FROM LIQUID SUPPLY

(71) Applicant: Philip Morris Products S.A., Neuchatel (CH)

(72) Inventors: Oleg Mironov, Neuchatel (CH); Jerome Christian Courbat, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 784 days.

(21) Appl. No.: 17/049,480

(22) PCT Filed: Apr. 24, 2019

(86) PCT No.: PCT/EP2019/060496
§ 371 (c)(1),
(2) Date: Oct. 21, 2020

(87) PCT Pub. No.: WO2019/206985
PCT Pub. Date: Oct. 31, 2019

(65) Prior Publication Data

US 2021/0186104 A1 Jun. 24, 2021

(30) Foreign Application Priority Data

Apr. 26, 2018 (EP) .................................... 18169618

(51) Int. Cl.
*A24F 40/46* (2020.01)
*A24F 40/42* (2020.01)
(Continued)

(52) U.S. Cl.
CPC .............. *A24F 40/46* (2020.01); *A24F 40/42* (2020.01); *A24F 40/44* (2020.01); *A24F 40/465* (2020.01);
(Continued)

(58) Field of Classification Search
CPC ........ A24F 40/46; A24F 40/44; A24F 40/465; A24F 40/48; A24F 40/42
See application file for complete search history.

(56) References Cited

U.S. PATENT DOCUMENTS

| | | | | |
|---|---|---|---|---|
| 10,986,868 B2 * | 4/2021 | Chen | ........................ | H05B 3/34 |
| 2015/0090279 A1 * | 4/2015 | Chen | ........................ | A24F 40/44 131/329 |

(Continued)

FOREIGN PATENT DOCUMENTS

| | | | |
|---|---|---|---|
| CN | 204070542 U | 1/2015 | |
| CN | 105559147 A | 5/2016 | |

(Continued)

OTHER PUBLICATIONS

Japanese Office Action dated Apr. 6, 2023 in Japanese Patent Application No. 2020-560139 (with English Translation), 5 pages.

(Continued)

*Primary Examiner* — Hae Moon Hyeon
(74) *Attorney, Agent, or Firm* — Oblon, McClelland, Maier & Neustadt, L.L.P.

(57) ABSTRACT

A vaporiser assembly for an electrically operated aerosol-generating device is provided, including: a substantially planar, fluid-permeable heating element having opposing first and second sides; a liquid transport medium having a first side in contact with the second side of the heating element, a second side opposite to the first side, and a thickness between the first and the second sides of the medium is between 1 mm and 5 mm, the heating element extending over a first area of the first side of the medium; and a liquid supply conduit having a first end in contact with the second side of the medium and extending over only a second area of the second side of the medium, the second area being smaller than the first area, and the medium being (Continued)

configured to transport liquid from the conduit to the first area of the second side of the heating element.

13 Claims, 5 Drawing Sheets

(51) Int. Cl.

| | |
|---|---|
| ***A24F 40/44*** | (2020.01) |
| ***A24F 40/465*** | (2020.01) |
| ***A24F 40/48*** | (2020.01) |
| ***A24F 40/57*** | (2020.01) |
| ***H05B 1/02*** | (2006.01) |
| ***H05B 3/34*** | (2006.01) |
| *A24F 40/10* | (2020.01) |

(52) U.S. Cl.

CPC .............. *A24F 40/48* (2020.01); *A24F 40/57* (2020.01); *H05B 1/0297* (2013.01); *H05B 3/34* (2013.01); *A24F 40/10* (2020.01)

(56) References Cited

U.S. PATENT DOCUMENTS

| | | | | |
|---|---|---|---|---|
| 2016/0007655 A1* | 1/2016 | Li | A24F 40/46 392/390 |
| 2016/0029698 A1 | 2/2016 | Xiang | |
| 2016/0135505 A1* | 5/2016 | Li | H05B 3/44 131/329 |
| 2017/0020193 A1 | 1/2017 | Davis et al. | |
| 2017/0035112 A1 | 2/2017 | Thorens | |
| 2018/0132532 A1 | 5/2018 | Batista | |

FOREIGN PATENT DOCUMENTS

| | | | |
|---|---|---|---|
| CN | 107645914 | A | 1/2018 |
| EP | 0 893 071 | A1 | 1/1999 |
| EP | 2 265 138 | A1 | 12/2010 |
| EP | 2 965 642 | A1 | 1/2016 |
| EP | 3 020 292 | A1 | 5/2016 |
| RU | 2 596 108 | C1 | 8/2016 |
| RU | 2 646 554 | C9 | 3/2018 |
| WO | WO 2015/117700 | A1 | 8/2015 |
| WO | WO 2016/198417 | A1 | 12/2016 |
| WO | WO 2017/019402 | A2 | 2/2017 |
| WO | WO 2017/025310 | A1 | 2/2017 |
| WO | WO 2017/191176 | A1 | 11/2017 |

OTHER PUBLICATIONS

Combined Russian Notice of Allowance and Search Report dated Aug. 25, 2022 in Russian Patent Application No. 2020137101/03 (with English translation), 17 pages.

International Search Report and Written Opinion dated Jul. 9, 2019 in PCT/EP2019/060496 filed Apr. 24, 2019.

Combined Chinese Office Action and Search Report dated Aug. 23, 2023, in corresponding Chinese Patent Application No. 201980023459.4) (with English Translation), 13 pages.

* cited by examiner

HEATER ASSEMBLY HAVING HEATER ELEMENT ISOLATED FROM LIQUID SUPPLY

CROSS-REFERENCE TO RELATED APPLICATIONS

This application is a U.S. national stage application of PCT/EP2019/060496, filed on Apr. 24, 2019, which is based upon and claims the benefit of priority under 35 U.S.C. § 119 to European patent application no. 18169618.8, filed Apr. 26, 2018, the entire contents of each of which are incorporated herein by reference.

TECHNICAL HELD

The invention relates to aerosol-generating devices that heat a liquid substrate to form an aerosol. In particular, the invention relates to handheld aerosol generating devices that produce an aerosol for user inhalation.

DESCRIPTION OF THE RELATED ART

Handheld aerosol-generating systems that produce an aerosol for inhalation from a liquid substrate are becoming more widely used, both in the field of medical inhalers for drug delivery and in the field of smoking products that are alternatives to cigarettes, such as e-cigarettes.

In an e-cigarette the aerosol is typically formed by heating a liquid aerosol-forming substrate. The liquid is held in a liquid storage reservoir and delivered to a heating element by a capillary material or wick extending between the reservoir and the heating element. A high retention material (HRM) may be placed in contact with the heating element to retain liquid in proximity with the heating element.

In one configuration, a mesh heater is simply placed over an HRM containing a liquid aerosol-forming substrate. The mesh heater forms part of an airflow passage through which a user can draw vapour. The heating element is activated in response to a user puff on the device. When the heating element is activated, liquid in the HRM close to the heating element is vaporised and drawn away from the heating element by the user puff. More liquid is then drawn into the HRM from the liquid storage reservoir. The function of the HRM or capillary wick is to ensure an adequate amount of liquid is close to the heating element, whatever the orientation of the system with respect to gravity. So for each user puff a sufficient amount of liquid is vaporised and subsequently forms an aerosol. The heating element and liquid storage reservoir are typically provided together as a disposable cartridge. This arrangement has the advantage of being simple to manufacture and being robust. An example of this type of arrangement is described in WO2015117700A1.

One issue with this type of system is heating efficiency. Heat is transferred not only to the liquid that is desired to be vaporised but also, to a significant degree, to the rest of the liquid in the liquid storage reservoir, which is not required to be vaporized during the user puff. The thermal mass of the rest of e-liquid, which is heated by conduction and convection by the e-liquid to be vaporized, creates heat losses at the heater area and so creates the need for extra power. In handheld devices that are typically battery powered, it is particularly critical to improve heating efficiency and so reduce the need to recharge or replace the batteries frequently and allow small form factor batteries to be used.

It would be desirable to solve or to decrease the significance of this issue.

SUMMARY

In a first aspect, there is provided a vaporiser assembly for an electrically operated aerosol-generating device comprising:

- a generally planar, fluid permeable heating element having a first side and a second side opposite the first side;
- a liquid transport medium, the liquid transport medium having a first side in contact with the second side of the heating element and a second side opposite to the first side, the heating element extending over a first area of the first side of the liquid transport medium; and
- a liquid supply conduit having a first end in contact with the second side of the liquid transport medium and extending over only a second area of the second side of the liquid transport medium, wherein the second area is smaller than the first area;
- wherein the liquid transport medium is arranged to transport liquid from the liquid supply conduit to the first area of the second side of the heating element.

BRIEF DESCRIPTION OF THE DRAWINGS

Embodiments of the invention will now be described in detail, by way of example only, with reference to the accompanying drawings, in which.

DETAILED DESCRIPTION

Figure 1:
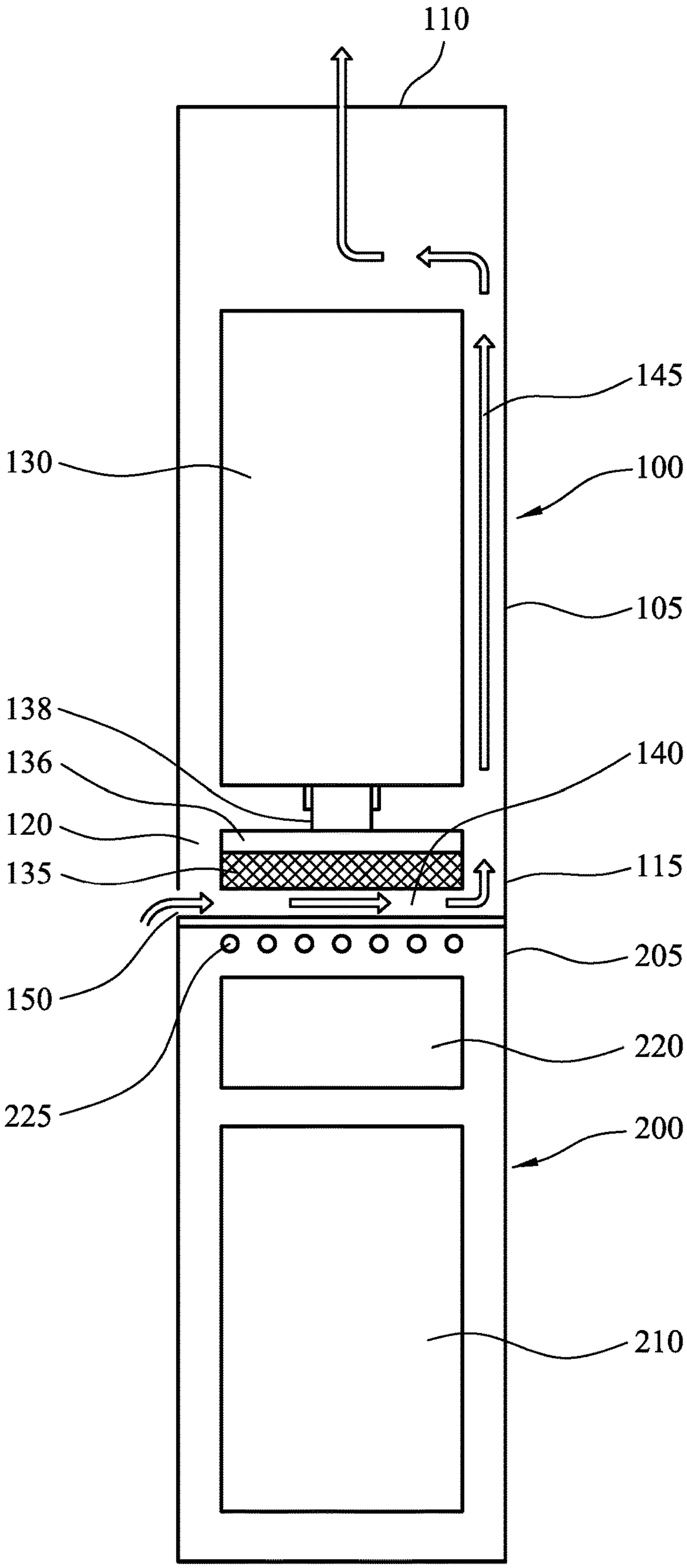
FIG. 1 is a schematic illustration of an aerosol-generating system of a first embodiment of the invention.

Having the liquid supply conduit extend over a relative small area of the liquid transport medium compared to the heating element has the advantage that only a small proportion of the heat generated by the heater is transferred to the liquid in the liquid supply conduit. This provides good heating efficiency for the vaporiser assembly, in that less heat is transferred away from the liquid transport medium compared to the arrangement of the prior art described above. The second area may be less than 50% of the first area and preferably less than 30% of the first area.

The liquid transport medium advantageously covers the entire heating element. This is maximises aerosol-generation for a given input power. It also avoids hot spots at the edge of the transport material. Hot spots could lead to the generation of undesirable chemical compounds.

The liquid transport medium may have a capillary structure arranged to transport liquid parallel to the second side of the heating element. This allows the liquid to be effectively transported across the entire heating element. In the systems of the prior art, there is the potential for bubbles to form in the HRM or capillary wick, which affect the correct liquid transfer from the liquid storage reservoir to the heating element. With the arrangement of the present invention, the potential for the formation of bubbles in the liquid supply conduit is reduced. The liquid transport medium may be may relatively thin so that vapour formed in the liquid transport can easily escape, and is unlikely to pass back into the liquid supply conduit.

A thickness of the liquid transport medium between the first and second sides of the liquid transport medium may be between 1 mm and 5 mm. The liquid transport medium may have an area of between 50 $mm^2$ and 500 $mm^2$.

The vaporiser assembly may be used to generate vapour or aerosol for inhalation by a user, for example in an electric smoking system. The construction and operation of the vaporiser assembly may be such that all of the liquid that is held in the liquid transport medium may be vaporised in a single user puff. Liquid that is subsequently drawn into the liquid transport medium to replace the vaporised liquid is vaporised in a subsequent puff. By appropriate selection of the dimensions of the liquid transport medium, a desired and consistent amount of vapour can be produced during each user puff.

The vaporiser assembly may comprise a housing, the heating element and the liquid transport medium being retained in the housing, wherein the housing engages or is integral with the liquid supply conduit. With this arrangement the heating element and liquid transport medium may be held together and aligned with one another.

In order to allow vapour to escape from the vaporiser assembly, the heating element is fluid permeable. Fluid permeable in this context means that vapour can escape from the liquid transport medium through the plane of the heating element. To allow this, the heating element may comprise apertures or pores though which vapour can pass. For example, the heating element may comprise a mesh or fabric of electrically resistive filaments. Alternatively, or in addition, the heating element may comprise a sheet with holes or slots in it.

The heating element may be a resistive heating element, which is supplied directly with an electrical current in use.

The resistive heating element may comprise a plurality of interstices or apertures extending from the second side to the first side and through which fluid may pass.

The resistive heating element may comprise a plurality of electrically conductive filaments. The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The resistive heating element may be an array of filaments, for example arranged parallel to each other. Preferably, the filaments may form a mesh. The mesh may be woven or non-woven. The mesh may be formed using different types of weave or lattice structures. Alternatively, the resistive heating element consists of an array of filaments or a fabric of filaments.

The filaments may define interstices between the filaments and the interstices may have a width of between 10 micrometres and 100 micrometres. Preferably, the filaments give rise to capillary action in the interstices, so that in use, liquid to be vaporized is drawn into the interstices, increasing the contact area between the heating element and the liquid aerosol-forming substrate.

The filaments may form a mesh of size between 60 and 240 filaments per centimetre (+/−10 percent). Preferably, the mesh density is between 100 and 140 filaments per centimetres (+/−10 percent). More preferably, the mesh density is approximately 115 filaments per centimetre. The width of the interstices may be between 100 micrometres and 25 micrometres, preferably between 80 micrometres and 70 micrometres, more preferably approximately 74 micrometres. The percentage of open area of the mesh, which is the ratio of the area of the interstices to the total area of the mesh may be between 40 percent and 90 percent, preferably between 85 percent and 80 percent, more preferably approximately 82 percent.

The filaments may have a diameter of between 8 micrometres and 100 micrometres, preferably between 10 micrometres and 50 micrometres, more preferably between 12 micrometres and 25 micrometres, and most preferably approximately 16 micrometres. The filaments may have a round cross section or may have a flattened cross-section.

The area of the filaments may be small, for example less than or equal to 50 square millimetres, less than or equal to 25 square millimetres, more preferably approximately 15 square millimetres. The size is chosen such to incorporate the heating element into a handheld system. The heating element may, for example, be rectangular and have a length between 2 millimetres to 10 millimetres and a width between 2 millimetres and 10 millimetres.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. Preferred materials for the electrically conductive filaments are stainless steel and graphite, more preferably 300 series stainless steel like AISI 304, 316, 304L, 316L. Additionally, the electrically conductive heating element may comprise combinations of the above materials. A combination of materials may be used to improve the control of the resistance of the substantially flat heating element. For example, materials with a high intrinsic resistance may be combined with materials with a low intrinsic resistance. This may be advantageous if one of the materials is more beneficial from other perspectives, for example price, machinability or other physical and chemical parameters. Advantageously, a substantially flat filament arrangement with increased resistance reduces parasitic losses. Advantageously, high resistivity heaters allow more efficient use of battery energy.

Preferably, the filaments are made of wire. More preferably, the wire is made of metal, most preferably made of stainless steel.

The electrical resistance of the filaments of the heating element may be between 0.3 Ohms and 4 Ohms. Preferably, the electrical resistance is equal or greater than 0.5 Ohms.

More preferably, the electrical resistance the heating element is between 0.6 Ohms and 0.8 Ohms, and most preferably about 0.68 Ohms.

Alternatively, the heating element may comprise a heating plate in which an array of apertures is formed. The apertures may be formed by etching or machining, for example. The plate may be formed from any material with suitable electrical properties, such as the materials described above in relation to filaments of a heating element.

The heating element may be a susceptor element. As used herein, a "susceptor element" means a conductive element that heats up when subjected to a changing magnetic field. This may be the result of eddy currents induced in the susceptor element and/or hysteresis losses. Advantageously the susceptor element is a ferrite element. The material and the geometry for the susceptor element can be chosen to provide a desired electrical resistance and heat generation.

The susceptor element may be a ferrite mesh susceptor element. Alternatively, the susceptor element may be a ferrous susceptor element.

The susceptor element may comprise a mesh. As used herein the term "mesh" encompasses grids and arrays of filaments having spaces therebetween, and may include woven and non-woven fabrics.

The mesh may comprise a plurality of ferrite or ferrous filaments. The filaments may define interstices between the filaments and the interstices may have a width of between 10 μm and 100 μm. Preferably the filaments give rise to capillary action in the interstices, so that in use, liquid to be vapourised is drawn into the interstices, increasing the contact area between the susceptor element and the liquid.

The filaments may form a mesh of size between 160 and 600 Mesh US (+/−10%) (i.e. between 160 and 600 filaments per inch (+/−10%)). The width of the interstices is preferably between 75 μm and 25 μm. The percentage of open area of the mesh, which is the ratio of the area of the interstices to the total area of the mesh is preferably between 25 and 56%. The mesh may be formed using different types of weave or lattice structures. Alternatively, the filaments consist of an array of filaments arranged parallel to one another.

The filaments may have a diameter of between 8 μm and 100 μm, preferably between 8 μm and 50 μm, and more preferably between 8 μm and 40 μm.

The area of the mesh may be small, preferably less than or equal to 500 mm2, allowing it to be incorporated in to a handheld system. The mesh may, for example, be rectangular and have dimensions of 15 mm by 20 mm.

Advantageously, the susceptor element has a relative permeability between 1 and 40000. When a reliance on eddy currents for a majority of the heating is desirable, a lower permeability material may be used, and when hysteresis effects are desired then a higher permeability material may be used. Preferably, the material has a relative permeability between 500 and 40000. This provides for efficient heating.

The housing may also be vapour permeable to allow for the escape of vapour. The housing may be vapour permeable adjacent to the second side of the liquid transport medium. This allows vapour to escape from opposite sides of the fluid transport material, further reducing the likelihood of bubbles being trapped that interfere with liquid transport.

The vaporiser assembly may comprise a liquid retention material in the liquid supply conduit. This may ensure the supply of liquid to the liquid transport medium whatever the orientation of the vaporiser assembly with respect to gravity. The liquid retention material is preferably different to the liquid transport medium. The liquid supply conduit may comprise one or more capillary tubes.

The liquid supply conduit may extend generally orthogonal to the first side of the heating element. This maximises the distance between the heating element and a second end of the liquid supply conduit. In use, the second end of the liquid supply conduit may be adjacent to a main liquid reservoir.

When viewed in a direction orthogonal to the first side of the heating element, the first area may not completely cover the second area. This reduces the transfer of heat from the heating element to the liquid supply conduit. When viewed in a direction orthogonal to the first side of the heating element, the heating element may not overlap the second area. This further increases a distance between the heating element and the first end of the liquid supply conduit and so reduces the transfer of heat from the heating element to the liquid supply conduit. The liquid supply conduit may have a cross sectional area of around 25% of the area of the liquid transport medium. The liquid supply conduit may have a diameter of between 2 mm and 5 mm.

In a second aspect, there is provided a cartridge for an aerosol-generating system, the cartridge comprising a vaporiser assembly in accordance with the first aspect and a liquid reservoir, the liquid supply conduit having a second end opposite the first end in communication with the liquid supply reservoir.

The heating element and liquid transport medium may be separable from the liquid supply reservoir. The liquid supply conduit may be fixed to the heating element and liquid supply conduit, or may be fixed to the liquid supply reservoir, or may be fixed to both. The liquid supply conduit may take the form of a bottleneck of the liquid supply reservoir. The liquid supply reservoir may comprise a reservoir housing. The reservoir housing may be integral with the liquid supply conduit.

In a third aspect, there is provided an aerosol-generating system comprising a vaporiser assembly in accordance with the first aspect, a liquid reservoir, the liquid supply conduit having a second end opposite the first end in communication with the liquid supply reservoir, a power supply, and control circuitry configured to control a supply of power from the power supply to the vaporiser assembly.

The aerosol-generating system may be a handheld system. The aerosol-generating system may comprise a mouthpiece through which a user can inhale aerosol generated by the aerosol-generating system.

The aerosol-generating system may comprise a main unit and a cartridge that engages with the main unit in use. The main unit may comprise a housing. The housing may hold the power supply and the control circuitry. The vaporiser assembly and liquid reservoir may be provided in the cartridge. The vaporiser assembly may be part of the main unit and the liquid reservoir provided in the cartridge. The housing may receive at least a portion of the cartridge. The mouthpiece may be part of the main unit or part of the cartridge.

The aerosol-generating system may comprise an air flow passage extending from an air inlet, past the vaporiser assembly to an outlet. The outlet may be in a mouthpiece.

The aerosol-generating system may have a size comparable to a conventional cigar or cigarette. The aerosol-generating system may have a total length between about 30 mm and about 150 mm. The aerosol-generating system may have an external diameter between about 5 mm and about 30 mm.

The power supply may be a DC power supply. The power supply may be a battery. The battery may be a Lithium based battery, for example a Lithium-Cobalt, a Lithium-Iron- Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more user experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the atomiser assembly.

The control circuitry may comprise a microcontroller. The microcontroller is preferably a programmable microcontroller. The control circuitry may comprise further electronic components. The control circuitry may be configured to regulate a supply of power to the heating element. Power may be supplied to the heating element continuously following activation of the system or may be supplied intermittently, such as on a puff-by-puff basis. The power may be supplied to the aerosol-generating element in the form of pulses of electrical current. The control circuitry may include an airflow sensor and the control circuitry may supply electrical power to the heating element when user puffs are detected by the airflow sensor.

In operation, a user may activate the system by puffing on a mouthpiece or providing some other user input, for example by pressing a button on the system. The control circuitry then supplies power to the heating element power may be supplied to the heating element for a predetermined time period or for the duration of a user puff. The heating element then heats the liquid in the liquid transport medium to form a vapour that escapes from the vaporiser assembly into an air flow passage through the system. The vapour cools and condenses for form an aerosol that is then drawn into the user's mouth.

In all aspects of the invention, the liquid may be a liquid aerosol-forming substrate. As used herein with reference to the present invention, an aerosol-forming substrate is a substrate capable of releasing volatile compounds that can form an aerosol. Volatile compounds may be released by heating the aerosol-forming substrate.

The liquid aerosol-forming substrate may be liquid at room temperature. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavours.

The liquid aerosol-forming substrate may comprise nicotine and at least one aerosol former. The aerosol former may be glycerine or propylene glycol. The aerosol former may comprise both glycerine and propylene glycol. The liquid aerosol-forming substrate may have a nicotine concentration of between about 0.5% and about 10%, for example about 2%.

In all aspects, the liquid transport medium is a material that a conveys liquid from one end of the material to another. The liquid transport medium may be a capillary material. The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid aerosol-forming substrate towards the heating element. Alternatively, the capillary material may comprise sponge-like or foam-like material. The structure of the capillary material forms a plurality of small bores or tubes, through which the liquid aerosol-forming substrate can be transported by capillary action. The liquid transport medium is exposed to the high temperature of the heating element and so must be stable at those temperatures.

The liquid transport medium may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as glass fibre, cellulose acetate, polyester, or bonded polyolefin, polyethylene, terylene or polypropylene fibres, nylon fibres or ceramic. The fibres may be woven or may form an amorphous structure. The liquid transport medium may have any suitable capillarity and porosity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the liquid transport medium by capillary action.

In all aspects, the liquid retention material in the liquid supply conduit may also be a capillary material. However, it need not withstand temperatures as high as the liquid transport medium. The liquid retention material may be a foam, a sponge or a collection of fibres. The liquid retention material may be formed from a polymer or co-polymer. In one example the liquid retention material is a woven polypropylene and poly(ethylene-terephthalate).

FIG. 1 is a schematic illustration of an aerosol-generating system in accordance with a first embodiment of the invention. The system comprises two main components, a cartridge 100 and a main body 200. A connection end 115 of the cartridge 100 is removably connected to a corresponding connection end 205 of the main body 200. The main body contains a battery 210, which in this example is a rechargeable lithium ion battery, and control circuitry 220. The aerosol-generating system is portable and has a size comparable to a conventional cigar or cigarette.

The cartridge 100 comprises a housing 105 containing an atomising assembly 120 and a liquid storage compartment 130 defining a liquid supply reservoir. A liquid aerosol-forming substrate is held in the liquid storage compartment 130. The atomising assembly is connected to a bottleneck of the liquid storage compartment 130. The atomising assembly comprises a heating element 135, in the form of a fluid permeable mesh, on a liquid transport medium 136. The liquid transport medium 136 covers the entire heating element 135. A liquid supply conduit 138 extends between the bottle neck of the liquid storage compartment 130 and the liquid transport medium 136. A high retention material (FIRM) or capillary material 139 is placed within the liquid supply conduit 138. Liquid from the liquid storage compartment 130 is drawn into the liquid supply conduit 138 and from there is spread across the liquid transport medium 136. This means that there is a particular volume of liquid in the liquid transport medium 136, adjacent the heating element 135, which can be readily vaporised by the heating element 135.

An air flow passage 140, 145 extends through the system from an air inlet 150 past the heating element 135 and from the heating element 135 to a mouth end opening 110 in the housing 105.

The heating element 135 is a susceptor that is inductively heated when exposed to a high frequency oscillating magnetic field. An inductor coil 225, which in this example is a pancake coil, is positioned within the main body, adjacent to the heating element 135. The control circuitry a high frequency oscillating current to the coil 225, which in turn generates a time varying magnetic flux across the heating element 135.

The system is configured so that a user can puff or suck on the mouth end opening 110 of the cartridge to draw aerosol into their mouth. In operation, when a user puffs on the mouth end opening 110, air is drawn through the airflow passage 140, 145 from the air inlet 150, past the heating element 135, to the mouth end opening 110. The control circuitry 220 controls the supply of electrical power from the battery 210 to the coil 225. This in turn controls the temperature of the heating element 135 and so the amount and properties of the vapour produced by the atomising assembly. The control circuitry 220 may include an airflow sensor and the control circuitry 220 may supply electrical power to the coil 225 when user puffs on the cartridge 100 are detected by the airflow sensor. This type of control arrangement is well established in aerosol-generating systems such as inhalers and e-cigarettes. So when a user sucks on the mouth end opening 110 of the cartridge 100, the atomising assembly is activated and generates a vapour that is entrained in the air flow passing through the air flow passage 140. The vapour cools within the airflow in passage 145 to form an aerosol, which is then drawn into the user's mouth through the mouth end opening 110.

The embodiments shown in FIGS. 1-3 all rely on inductive heating. Inductive heating works by placing an electrically conductive article to be heated in a time varying magnetic field. Eddy currents are induced in the conductive article. If the conductive article is electrically isolated the eddy currents are dissipated by Joule heating of the conductive article. In an aerosol-generating system that operates by heating an aerosol-forming substrate, the aerosol-forming substrate is typically not itself sufficiently electrically conductive to be inductively heated in this way. So in the embodiments shown in FIGS. 1-3 a susceptor element is used as the conductive article that is heated. The aerosol-forming substrate is then heated by the susceptor element by thermal conduction, convention and/or radiation. Because a ferromagnetic susceptor element is used, heat is also generated by hysteresis losses as the magnetic domains are switched within the susceptor element.

The embodiments described in FIGS. 1-3 use an inductor coil to generate a time varying magnetic field. The inductor coil is designed so that it does not undergo significant Joule heating. In contrast the susceptor element is designed so that there is significant Joule heating of the susceptor.

The oscillating magnetic field passes through the susceptor element, inducing eddy currents in the susceptor element. The susceptor element heats up as a result of Joule heating and as a result of hysteresis losses, reaching a temperature sufficient to vapourise the aerosol-forming substrate close to the susceptor element. The vapourised aerosol-forming substrate is entrained in the air flowing from the air inlet to the air outlet, as explained in more detail below and cools to form an aerosol within the mouthpiece portion before entering the user's mouth. The control electronics supplies the oscillating current to the coil for a predetermined duration, in this example five seconds, after detection of a puff and then switches the current off until a new puff is detected.

Figure 2A:
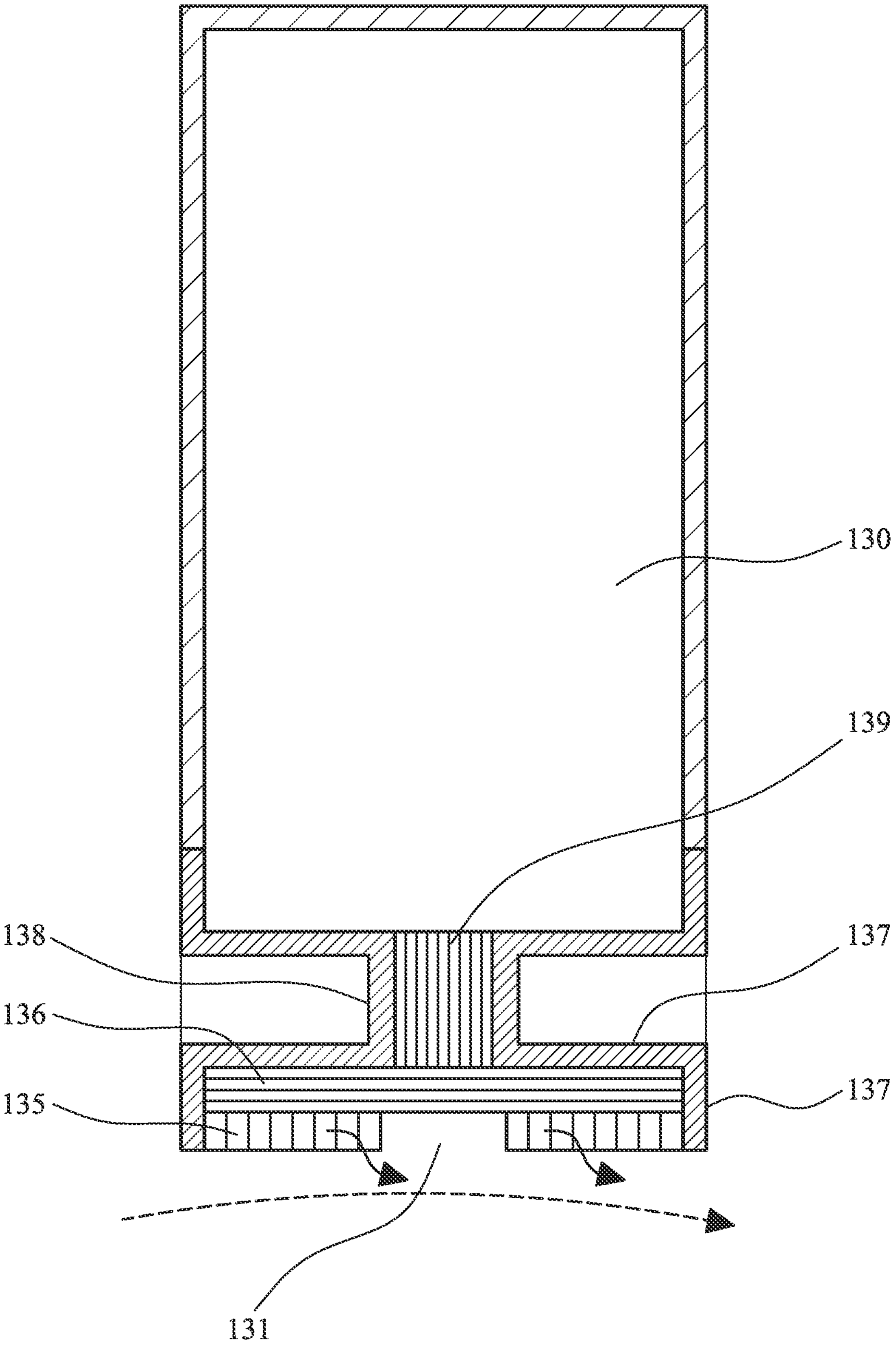
FIG. 2*a* shows in detail a vaporiser assembly for the embodiment shown in FIG. 2.

FIG. 2*a* illustrates a vaporiser assembly for the aerosol-generating system of FIG. 1 in more detail. In the example shown in FIG. 2*a*, the vaporiser assembly has a housing 137. The housing 137 is integrally formed with the liquid storage container 130. The housing 137 holds the heating element 135, the liquid transport medium 136, and the capillary material 139 within the liquid supply conduit 138.

Figure 2B:
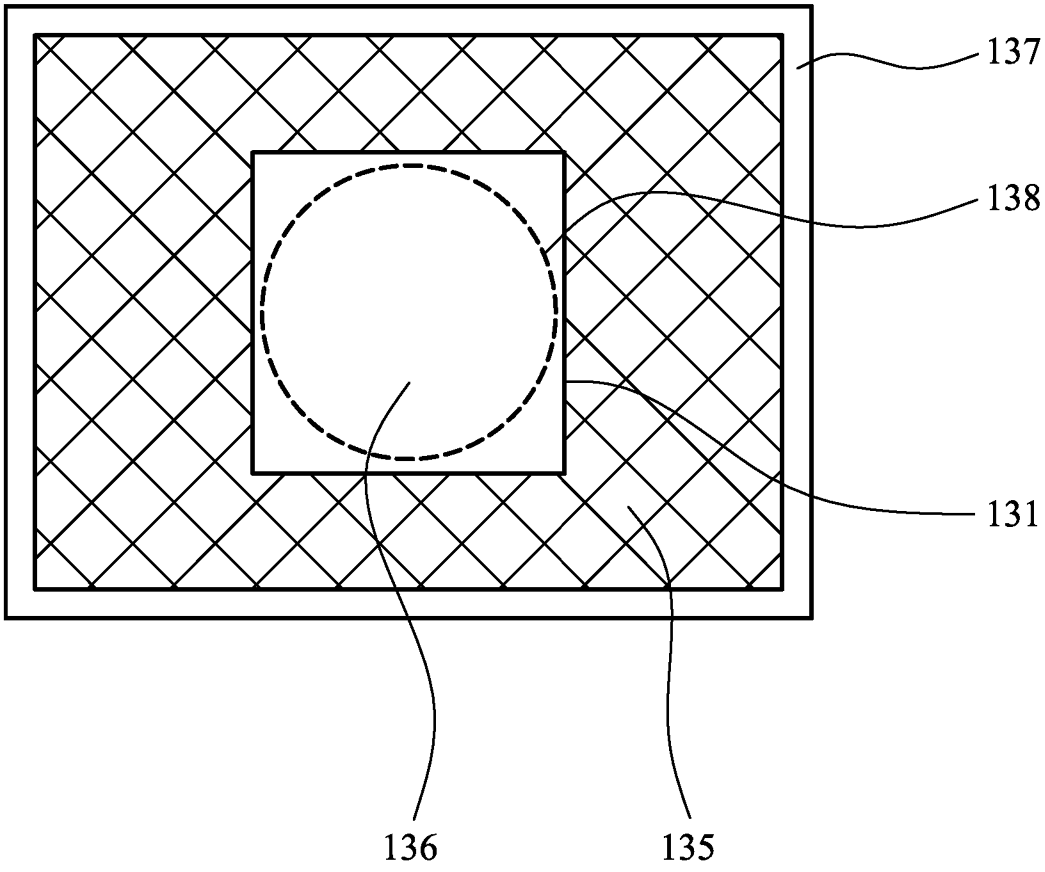
FIG. 2*b* is an underside view of the vaporiser assembly of FIG. 2*a;*

The heating element 135 comprises a stainless steel mesh. It is generally planar. FIG. 2*b* is an underside view of the vaporiser assembly. The stainless steel mesh is generally rectangular hut has a central aperture 131 cut out. The central aperture is such that, when viewed in a direction orthogonal to the plane of the mesh, the aperture covers the liquid supply conduit 138. The outline of the liquid supply conduit 138 is illustrated in dotted line in FIG. 2*b*. In this way the heating element 135 is removed from the liquid supply conduit 138 and so there is no significant heat transfer from the heating element 135 to the liquid in the liquid supply conduit 138. The aperture can be of any shape. For example, it may be circular to match a circular liquid supply conduit 138. In this example, the aperture is square.

In this example the liquid transport medium 136 is formed from a glass fibre material. Glass fibre typically has adequate heat resistance. The glass fibre is woven and provides capillary action to transport liquid in a direction parallel to the surface of the heating element 135 comprising the stainless steel mesh, e.g., a mesh susceptor element. In particular, the liquid transport medium 136 is arranged to transport liquid away from the area in contact with the liquid supply conduit 138 to the periphery of the liquid transport medium 136.

The capillary material 139 in the liquid supply conduit 138 is oriented to convey the liquid to the liquid transport medium 136. In this example that is orthogonal to the surface of the mesh susceptor element. The capillary material 139 may be comprised of woven polypropylene or poly(ethylene-terephthalate) (PET).

It can be seen from FIG. 2*b* that that the area of the liquid supply conduit 138 in contact with the liquid transport medium 136 is only a fraction of the total area of the liquid transport medium 136. The smaller the area of liquid supply conduit 138 in contact with the liquid transport medium 136 the lower the heat transfer from the heater back to the liquid in the liquid supply conduit 138. However, the area of contact needs to be sufficiently large to allow for the replenishment of liquid across the entire liquid transport medium 136 in a short time. This allows a user to take successive puffs within a short time and still receive sufficient and consistent aerosol with each puff. In this example, the liquid supply conduit 138 has a diameter of around 5 mm and the liquid transport medium has an area of around 300 $mm^2$. The capillary material in the liquid supply conduit 138 may have a similar volume to the liquid transport medium 136.

In use, when the induction coil 225 is activated as a result of a sensed user puff, the heating element 135 heats up to a temperature sufficient to vaporise the liquid held in the liquid transport medium 136. The heating is maintained for a duration sufficient to vaporise substantially all of the liquid in the liquid transport medium 136. This may be a fixed time period of two seconds, for example. The current through the coil 225 is then stopped and the heating element 135 cools until the next activation of the coil. Following vaporisation of the liquid in the liquid transport medium 136, more liquid flows from capillary material 139 in the liquid supply conduit 138 into the liquid transport medium 136. At the same time, liquid from the liquid storage compartment 130 replaces liquid in the liquid supply conduit 138. In this way another, similar, volume of liquid is delivered to the heating element 135 ready for the next user puff. This provides consistent aerosol volume. And the isolation of the heating element 135 from the main part of the liquid storage compartment 130 improves heating efficiency.

In the embodiment shown in FIGS. 2*a* and 2*b*, the vaporiser housing 137 is not fluid permeable and covers a back face of the liquid transport medium 136. This means that vapour generated in the liquid transport medium 136 must escape through the heating element 135 to be entrained in the airflow.

Figure 3A:
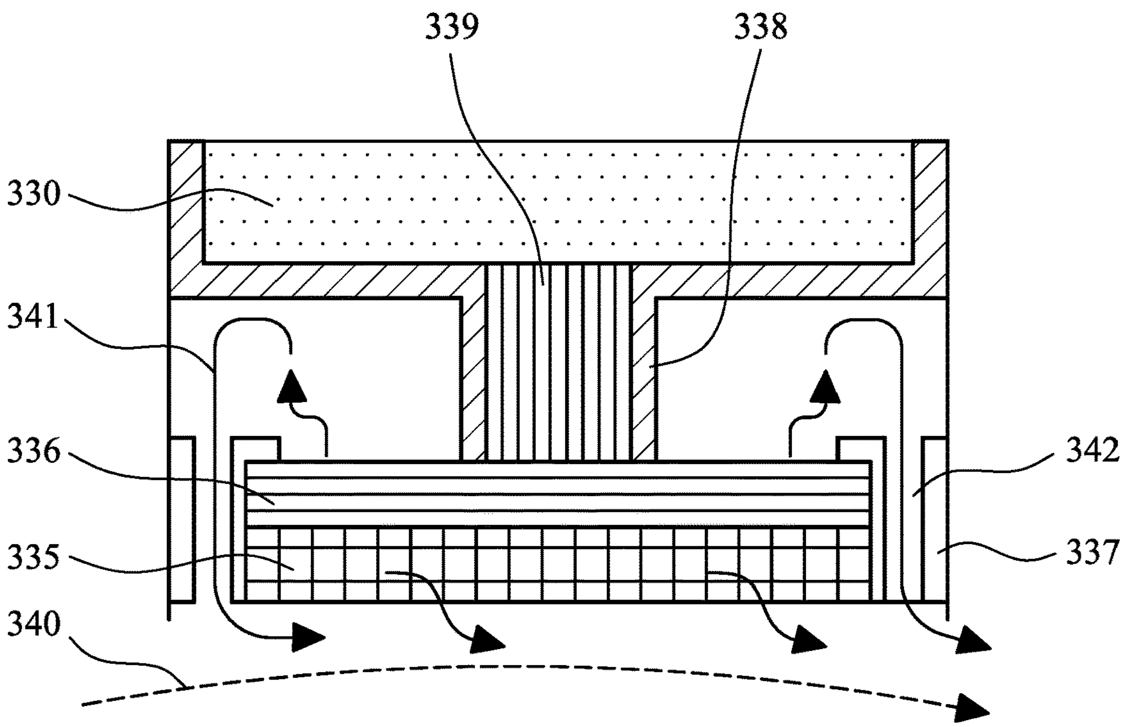
FIG. 3*a* is a schematic cross-section of a vaporiser assembly of a second embodiment of the invention.
Figure 3B:
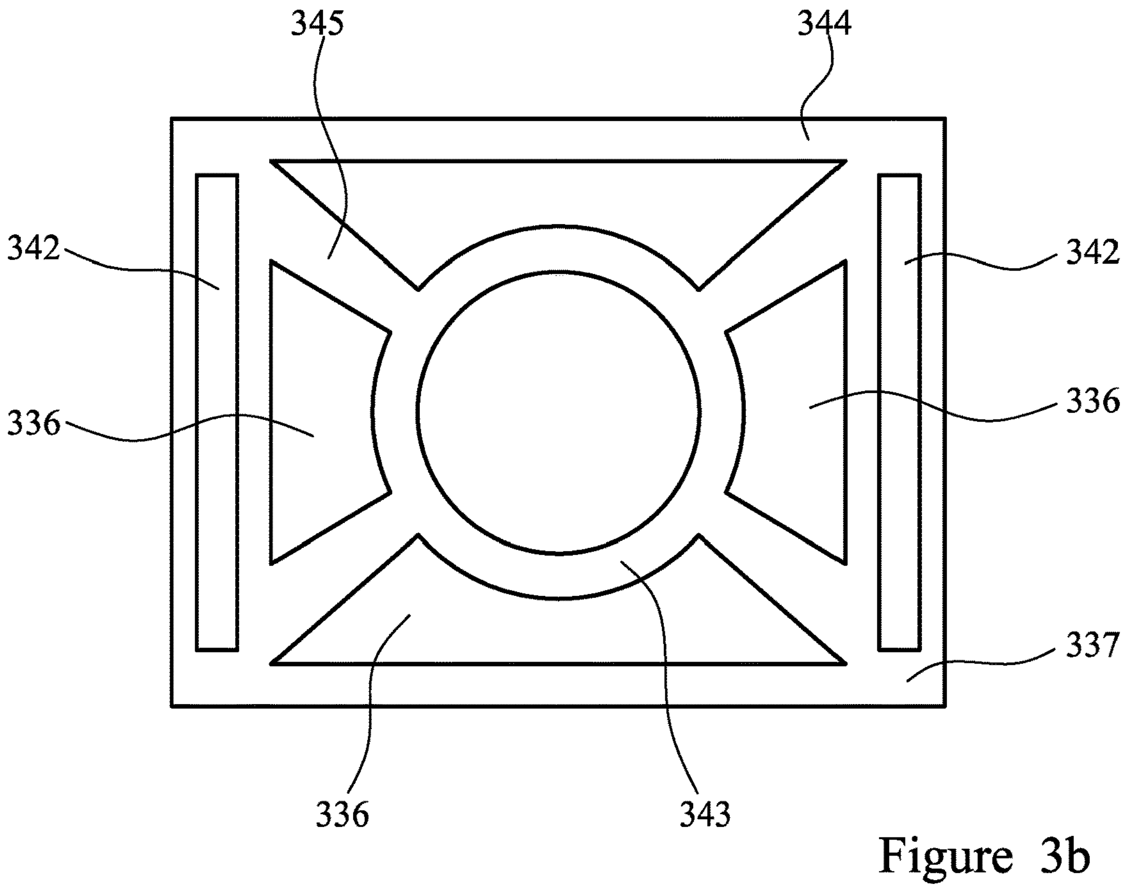
FIG. 3*b* is a view of the back side of vaporiser assembly of FIG. 3*a*.

FIGS. 3*a* and 3*b* illustrate another embodiment of a vaporiser than can be used in the system shown in FIG. 1, in which vapour generated in the liquid transport medium 336 can escape both through a first side of the liquid transport medium 336 adjacent the heating element 335 (in the example of FIGS. 3*a* and 3*b* again a mesh susceptor) and through a second side, opposite the first side.

FIG. 3*a* is a schematic illustration of the vaporiser assembly and a portion of the liquid storage compartment 330. The basic shape of the vaporiser assembly is the same as in the embodiment of FIG. 2. The housing 337 is integrally formed with the liquid storage compartment 330. The heating element 335 is separated from the main body of the liquid storage compartment 330 by a bottleneck, formed by liquid supply conduit 338. The housing 337 holds the heating element 335, the liquid transport medium 336 and the capillary material 339 within the liquid supply conduit 338.

The heating element 335 comprises a stainless steel mesh susceptor element and is generally planar. The liquid transport medium 336 is formed from a glass fibre material. The glass fibre is woven and provides capillary action to transport liquid in a direction parallel to the surface of the mesh susceptor element. In particular, the liquid transport medium 336 is arranged to transport liquid away from the area in contact with the liquid supply conduit 338 to the periphery of the liquid transport medium 336.

The capillary material 339 in the liquid supply conduit 338 is oriented to convey the liquid to the liquid transport medium 336. In this example that is orthogonal to the surface of the mesh susceptor element. The capillary material 339 may be comprised of woven polypropylene or poly(ethylene-terephthalate) (PET).

In use, when the induction coil 225 is activated as a result of a sensed user puff, the heating element 335 heats up to a temperature sufficient to vaporise the liquid held in the liquid transport medium 336. The heating is maintained for a duration sufficient to vaporise substantially all of the liquid in the liquid transport medium 336. This may be a fixed time period of two seconds for example. The current through the coil is then stopped and the heating element 335 cools until the next activation of the coil. Following vaporisation of the liquid in the liquid transport medium 336, more liquid flows from capillary material 339 in the liquid supply conduit 338 into the liquid transport medium 336. At the same time, liquid from the liquid storage compartment 330 replaces liquid in the liquid supply conduit 338. In this way another, similar volume of liquid is delivered to the heating element 335 ready for the next user puff. This provides consistent aerosol volume. And the isolation of the heating element 335 from the main part of the liquid storage compartment 330 improves heating efficiency.

It can be seen from FIG. 3*b* that that the housing 337 allows vapour to escape both through the heating element 335 (see FIG. 3*a*) and through a rear face of the liquid transport medium 336. The passage of the vapour is illustrated by the arrows in FIG. 3*a*.

The main airflow past the vaporiser is indicated by dotted arrow 340. Vapour escaping through the rear face of the liquid transport medium 336 can join the main airflow by passing through apertures 342 formed in the vaporiser housing 337. FIG. 3*b* is a view of the back face of the liquid transport medium 336, which illustrates the housing construction. The rear face of the housing 337 holding the liquid transport medium 336 and the heating element 335 is formed with a central portion 343 that joins, or is integral with, the liquid supply conduit 338 and a peripheral frame 344 which is joined to the central portion by a plurality of ribs 345. Between the ribs are spaces through which vapour can escape from the liquid transport medium 336.

In this example, the frame 344 has a size and shape that matches the cavity in the cartridge in which it is positioned. This is to confine airflow through the cartridge to the desired air flow passage or passages. So, in order to allow vapour that has escaped into the space 341 behind the rear face of the liquid transport medium 336 to join the main air flow 340, slots or apertures 342 are formed through the vaporiser housing 337. Alternatively, the vaporiser assembly may simply be made smaller that the cavity in which it is received so that vapour can move around the periphery of the housing 337 to join the main air flow.

The arrangement of FIGS. 3*a* and 3*b* have the advantage that vapour generated in the liquid transport medium 336 has many exit paths. This reduces the likelihood of bubbles being trapped in the liquid transport medium 336 or migrating to the liquid supply conduit 338 and interfering with efficient liquid transfer to the heating element 335.

Figure 4:
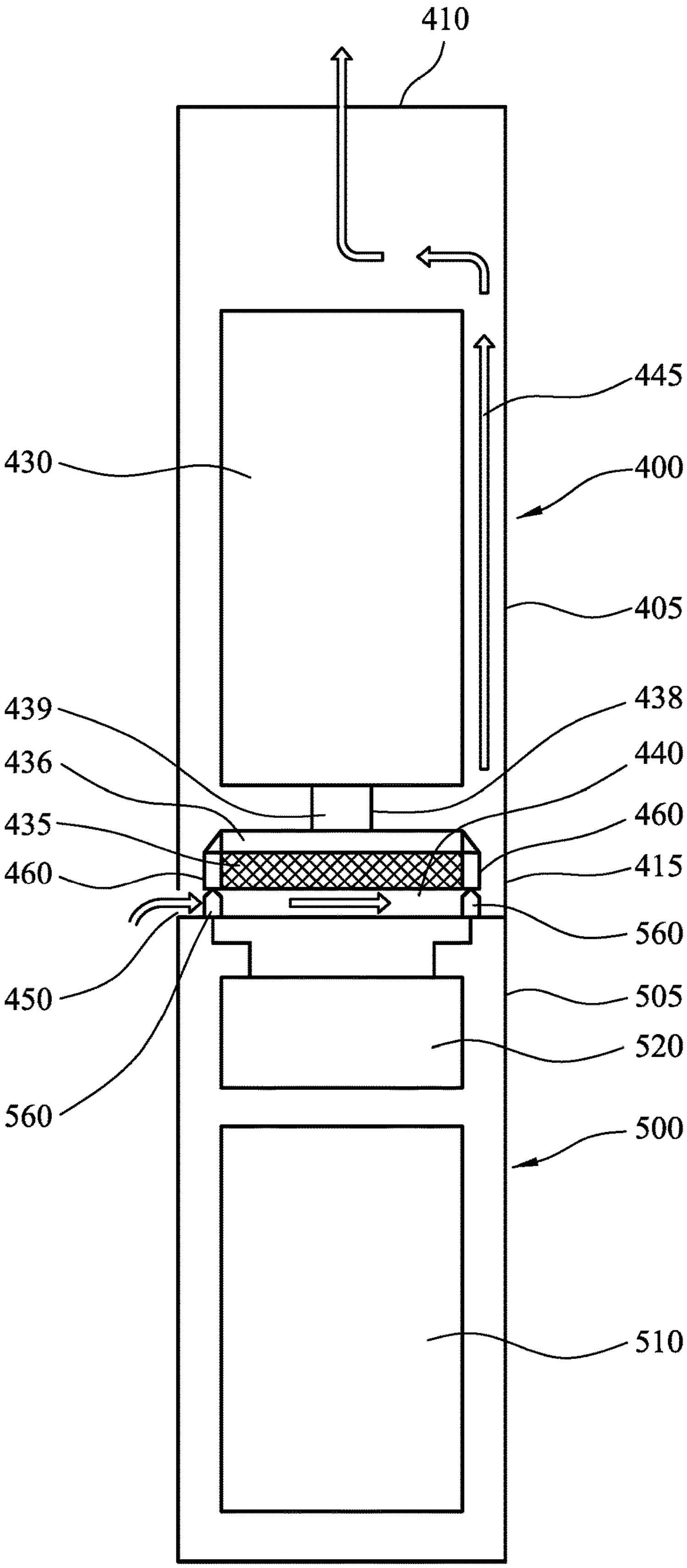
FIG. 4 is a schematic illustration of an aerosol-generating system of a third embodiment of the invention.

The embodiments described so far have included a heating element that is heated by inductive heating. However, it is possible to use a resistive heater instead. FIG. 4 is a schematic illustration of an aerosol-generating system in accordance with a third embodiment of the invention. The system is similar to the system shown in FIG. 1 but uses resistive heating rather than inductive heating.

The aerosol-generating device comprises two main components, a cartridge 400 and a main body 500. A connection end 415 of the cartridge 400 is removably connected to a corresponding connection end 505 of the main body 500.

The main body contains a battery 510, which in this example is a rechargeable lithium ion battery, and control circuitry 520.

The cartridge 400 comprises a housing 405 containing an atomising assembly and a liquid storage compartment 430 defining a liquid supply reservoir. A liquid aerosol-forming substrate is held in the liquid storage compartment 430. The atomising assembly is connected to a bottle neck of the liquid storage compartment 430. The atomising assembly comprises a heating element 435, in the form of a fluid permeable mesh, on a liquid transport medium 436. A liquid supply conduit 438 extends between the bottle neck of the liquid storage compartment 430 and the liquid transport medium 436. A high retention material (HRM) or capillary material 439 is placed within the liquid supply conduit 438. Liquid from the liquid storage compartment 430 is drawn into the liquid supply conduit 438 and from there is spread across the liquid transport medium 436. This means that there is a particular volume of liquid in the liquid transport medium 436, adjacent the heating element 435, which can be readily vaporised by the heating element 435.

An air flow passage 440, 445 extends through the system from an air inlet 450 past the heater element 435 and from the heating element 435 to a mouth end opening 410 in the housing 405.

As in the previously described embodiment, the heating element 435 comprises a stainless steel mesh and is generally planar. However, the vaporiser assembly also comprises a pair of electrical contact pads 460 positioned on opposite sides of the heating element 435. The contact pads are formed of electrically conductive material, such as copper, and are electrically connected to one another through the heating element 435.

The contact pads 460 face main body and are contacted by electrical contact pins 560 on the main body. The electrical contact pins are spring loaded to ensure good contact with the contact pads 460 when the cartridge 400 is connected to the main body 500. The electrical contact pins 560 on the main body 500 are connected to the control circuitry 520. Electrical power is supplied to the heating element 435 from the battery 510 through the electrical contact pads and electrical contact pins.

The liquid transport medium 436 is formed from a glass fibre material. The glass fibre is woven and provides capillary action to transport liquid in a direction parallel to the surface of the heating element 435, e.g., a mesh susceptor element. In particular, the liquid transport medium 436 is arranged to transport liquid away from the area in contact with the liquid supply conduit 438 to the periphery of the liquid transport medium 436.

The capillary material 439 in the liquid supply conduit 438 is oriented to convey the liquid to the liquid transport medium 436. In this example, that is orthogonal to the surface of the heating element 435. The capillary material 439 may be comprised of Woven polypropylene or poly (ethylene-terephthalate)(PET).

The system is configured so that a user can puff or suck on the mouth end opening 410 of the cartridge 400 to drat aerosol into their mouth. In operation, when a user puffs on the mouth end opening 410, air is drawn through the airflow passage 440 from the air inlet 415, past the heating element 435, to the mouth end opening 410. The control circuitry 520 controls the supply of electrical power from the battery 510 to the heating element 435. This in turn controls the temperature of the heating element 435 and so the amount and properties of the vapour produced by the atomising assembly. The control circuitry 520 may include an airflow sensor and the control circuitry 520 may supply electrical power to the heating element 435 when user puffs on the cartridge are detected by the airflow sensor. This type of control arrangement is well established in aerosol-generating systems such as inhalers and e-cigarettes. So when a user sucks on the mouth end opening 410 of the cartridge 400, the atomising assembly is activated and generates a vapour that is entrained in the air flow passing through the air flow passage 440. The vapour cools within the airflow in passage 445 to form an aerosol, which is then drawn into the user's mouth through the mouth end opening 410.

The embodiments described all have the advantage of isolating only that volume of liquid that is desired to be heated in each user puff from the remaining liquid in the liquid storage compartment so that that volume of liquid can be quickly and efficiently vaporised with relatively little heat transfer to the remaining liquid.

The invention claimed is:

1. A vaporiser assembly for an electrically operated aerosol-generating device, comprising:

a substantially planar, fluid-permeable heating element having a first side and a second side opposite the first side;

a liquid transport medium having a first side in contact with the second side of the heating element, and having a second side opposite to the first side, wherein the liquid transport medium has a capillary structure configured to transport liquid parallel to the second side of the heating element, and wherein a thickness of the liquid transport medium between the first and the second sides of the fluid transport medium is between 1 mm and 5 mm, the heating element extending over a first area of the first side of the liquid transport medium;

a liquid supply conduit having a first end in contact with the second side of the liquid transport medium and extending over only a second area of the second side of the liquid transport medium, wherein the second area is smaller than the first area, the liquid supply conduit further comprising a second end opposite the first end, the second end being configured to receive a liquid; and a liquid retention material or capillary material in the liquid supply conduit configured to transport liquid from the second end of the liquid supply conduit to the first end of the liquid supply conduit, wherein the liquid retention material or the capillary material is different than the liquid transport medium, and wherein the liquid transport medium is configured to transport liquid from the first end of the liquid supply conduit to a first area of the second side of the heating element.

2. The vaporiser assembly according to claim 1, wherein the second area is less than 50% of the first area.

3. The vaporiser assembly according to claim 1, wherein the second area is less than 30% of the first area.

4. The vaporiser assembly according to claim 1, further comprising a housing, wherein the heating element and the liquid transport medium are retained in the housing, and wherein the housing engages or is integral with the liquid supply conduit.

5. The vaporiser assembly according to claim 4, wherein the housing is perforated or vapour-permeable adjacent to the second side of the liquid transport medium.

6. The vaporiser assembly according to claim 1, wherein the liquid supply conduit extends substantially orthogonal to the first side of the heating element.

7. The vaporiser assembly according to claim 1, wherein the heating element comprises a mesh or fabric of electrically resistive filaments.

8. The vaporiser assembly according to claim 1, wherein the first area does not completely cover the second area when viewed in a direction orthogonal to the first side of the heating element.

9. The vaporiser assembly according to claim 8, wherein the heating element does not overlap the second area when viewed in the direction orthogonal to the first side of the heating element.

10. A cartridge for an aerosol-generating system, the cartridge comprising:

a vaporiser assembly according to claim 1; and a liquid reservoir, wherein the second end of the liquid supply conduit is in fluid communication with the liquid reservoir.

11. The cartridge according to claim 10, wherein the beating element and liquid transport medium are separable from the liquid reservoir.

12. An aerosol-generating system, comprising:

a vaporiser assembly according to claim 1;

a liquid reservoir, wherein the second end of the liquid supply conduit is in fluid communication with the liquid reservoir;

a power supply; and control circuitry configured to control a supply of power from the power supply to the vaporiser assembly.

13. The aerosol-generating system according to claim 12, wherein the aerosol-generating system is a handheld system comprising a mouthpiece configured such that a user can inhale aerosol generated by the aerosol-generating system through the mouthpiece.

* * * * *